(12) United States Patent
Miyata

(10) Patent No.: US 8,898,006 B2
(45) Date of Patent: Nov. 25, 2014

(54) NAVIGATION APPARATUS AND NAVIGATION METHOD

(75) Inventor: Hiromasa Miyata, Tokyo (JP)

(73) Assignee: Sony Corporation (JP)

( * ) Notice: Subject to any disclaimer, the term of this patent is extended or adjusted under 35 U.S.C. 154(b) by 339 days.

(21) Appl. No.: 12/661,425

(22) Filed: Mar. 17, 2010

(65) Prior Publication Data
US 2010/0250113 A1 Sep. 30, 2010

(30) Foreign Application Priority Data

Mar. 27, 2009 (JP) ................. P2009-079615

(51) Int. Cl.
G01C 21/00 (2006.01)
G01C 21/36 (2006.01)
(52) U.S. Cl.
CPC ........ G01C 21/3635 (2013.01); G01C 21/3647 (2013.01)
USPC ...................................................... 701/421
(58) Field of Classification Search
CPC ......... G01C 21/00; G01C 21/34; G08G 1/123
USPC ......... 701/400, 408–410, 412, 418, 421, 428, 701/429, 431, 436, 527
See application file for complete search history.

(56) References Cited

U.S. PATENT DOCUMENTS

| | | | |
|---|---|---|---|
| 5,884,218 A * | 3/1999 | Nimura et al. ................ | 701/428 |
| 6,201,544 B1 | 3/2001 | Ezaki | |
| 6,295,066 B1 | 9/2001 | Tanizaki et al. | |
| 2003/0176965 A1 | 9/2003 | Padmanabhan | |
| 2006/0074553 A1 * | 4/2006 | Foo et al. ....................... | 701/212 |
| 2007/0073475 A1 * | 3/2007 | Endo .............................. | 701/207 |
| 2008/0040024 A1 * | 2/2008 | Silva ............................. | 701/200 |
| 2009/0177383 A1 * | 7/2009 | Tertoolen ..................... | 701/208 |

FOREIGN PATENT DOCUMENTS

| | | |
|---|---|---|
| EP | 0766217 A2 | 4/1997 |
| EP | 1 024 347 A1 | 8/2000 |
| EP | 1855263 A1 | 11/2007 |
| JP | 8297032 | 11/1996 |
| JP | 9318381 | 12/1997 |
| JP | 11-065428 A | 3/1999 |
| JP | 11-149571 A | 6/1999 |
| JP | 2001027534 A | 1/2001 |

(Continued)

OTHER PUBLICATIONS

European Search Report EP10156518, dated Nov. 4, 2010.

(Continued)

Primary Examiner — Kim T Nguyen
(74) Attorney, Agent, or Firm — Lerner, David, Littenberg, Krumholz & Mentlik, LLP

(57) ABSTRACT

A navigation apparatus includes a positioning unit configured to measure a current position, a route guidance screen generation unit configured to generate a route guidance screen used for route guidance for a retrieved route from the current position to a destination and display the route guidance screen on a display unit, and a guidance image generation unit configured to, in a case where a remaining distance between the current position and the destination is a predetermined value or less while route guidance is performed using the route guidance screen, generate a guidance image in which a display subject representing the destination is highlighted such that the display subject is more prominently displayed than a vicinity of the display subject and display the guidance image on the display unit.

16 Claims, 12 Drawing Sheets

(56) References Cited

FOREIGN PATENT DOCUMENTS

| | | | |
|---|---|---|---|
| JP | 2001165687 A | 6/2001 |
| JP | 2001304901 A | 10/2001 |
| JP | 2002-071363 A | 3/2002 |
| JP | 2002168637 A | 6/2002 |
| JP | 2005077381 A | 3/2005 |
| JP | 2005134489 A | 5/2005 |
| JP | 2005221285 A | 8/2005 |
| JP | 2006162534 A | 6/2006 |
| JP | 2007206298 A | 8/2007 |
| JP | 2007256124 A | 10/2007 |
| WO | 2006103955 A1 | 10/2006 |

OTHER PUBLICATIONS

Office Action from Japanese Application No. 2009-079615, dated Jun. 25, 2013.

* cited by examiner

NAVIGATION APPARATUS AND NAVIGATION METHOD

CROSS-REFERENCE TO RELATED APPLICATION

The present application claims priority from Japanese Patent Application No. JP 2009-079615 filed in the Japanese Patent Office on Mar. 27, 2009, the entire content of which is incorporated herein by reference.

BACKGROUND OF THE INVENTION

1. Field of the Invention

The present invention relates to navigation apparatuses and navigation methods, and, more particularly, to a navigation apparatus and a navigation method which are preferably applied to a vehicle navigation apparatus designed for vehicle use.

2. Description of the Related Art

For example, Japanese Unexamined Patent Application Publication No. 11-65428 discloses a navigation apparatus for three-dimensionally displaying a target building on a map display screen.

SUMMARY OF THE INVENTION

The navigation apparatus disclosed in Japanese Unexamined Patent Application Publication No. 11-65428 three-dimensionally displays only the target building. Accordingly, the relationship between the position of the target building and the current position of a user's vehicle is unclear. If a plurality of buildings are present near the target building, it is difficult for a user to determine whether a building in front of the user is the target building.

The present invention provides a navigation apparatus and a navigation method which are capable of allowing a user to determine which of displayed subjects is a subject set as a destination on the basis of the relationship between the current position of the user and the destination with certainty.

A navigation apparatus according to an embodiment of the present invention includes: positioning means for measuring a current position; route guidance screen generating means for generating a route guidance screen used for route guidance for a retrieved route from the current position to a destination and displaying the route guidance screen on displaying means; and guidance image generating means for, in a case where a remaining distance between the current position and the destination is a predetermined value or less while route guidance is performed using the route guidance screen, generating a guidance image in which a display subject representing the destination is highlighted such that the display subject is more prominently displayed than a vicinity of the display subject and displaying the guidance image on the displaying means.

A navigation method according to an embodiment of the present invention includes the steps of: causing positioning means to measure a current position; causing route guidance screen generating means to generate a route guidance screen used for route guidance for a retrieved route from the current position to a destination and display the route guidance screen on displaying means; and causing guidance image generating means to, in a case where a remaining distance between the current position and the destination is a predetermined value or less while route guidance is performed using the route guidance screen, generate a guidance image in which a display subject representing the destination is highlighted such that the display subject is more prominently displayed than a vicinity of the display subject and display the guidance image on the displaying means.

Thus, when a remaining distance between a current position and a destination is a predetermined value or less while route guidance for a retrieved route from the current position to the destination is performed, a guidance image is displayed in which a display subject representing the destination is highlighted such that the display subject is more prominently displayed than a vicinity of the display subject. As a result, it is possible to allow a user to visually check the display subject representing the destination during route guidance with certainty.

According to the present invention, when a remaining distance between a current position and a destination is a predetermined value or less while route guidance for a retrieved route from the current position to the destination is performed, a guidance image is displayed in which a display subject representing the destination is highlighted such that the display subject is more prominently displayed than a vicinity of the display subject. As a result, it is possible to allow a user to visually check the display subject representing the destination during route guidance with certainty. Consequently, it is possible to obtain a navigation apparatus and a navigation method which are capable of allowing a user to determine which of displayed subjects is a subject set as a destination on the basis of the relationship between the current position of a user's vehicle and the destination with certainty.

DESCRIPTION OF THE PREFERRED EMBODIMENTS

Embodiments of the present invention will be described in the order of 1. First Embodiment, 2. Second Embodiment, and 3. Other Embodiments.

1. First Embodiment

1-1. Configuration of PND

Figure 1:
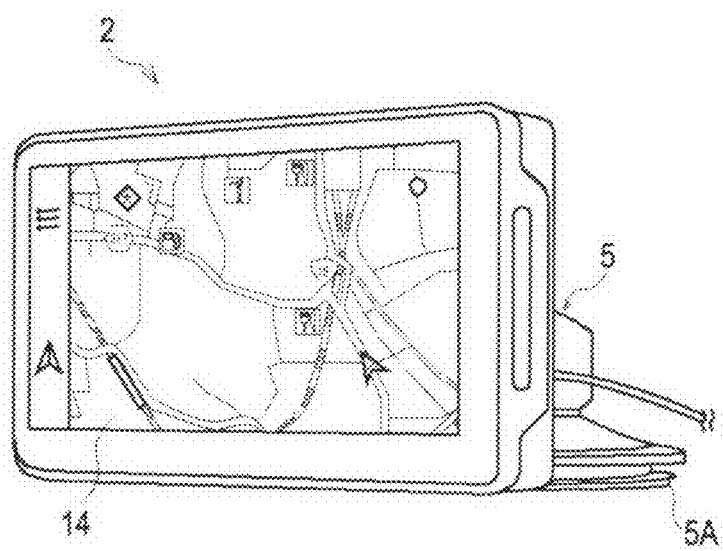
FIG. 1 is a schematic perspective view illustrating the external configuration of a navigation apparatus according to a first embodiment of the present invention.

FIG. 1 is a diagram illustrating a Personal Navigation Device (PND) 2 according to the first embodiment of the present invention. A cradle 5 disposed on the back surface of the PND 2 is attached to a vehicle's dashboard with a suction cup 5A and is electrically connected to a vehicle's battery.

The PND 2 is attached/removed to/from a vehicle with the cradle 5. When the PND 2 is attached to a vehicle, the PND 2 is held by the cradle 5 and is mechanically and electrically connected to the cradle 5.

As a result, the PND 2 operates with power supplied from the vehicle's battery via the cradle 5. When the PND 2 is removed from the cradle 5, the PND 2 operates with power supplied from an internal battery.

A display unit 14 is disposed on the front surface of the PND 2. The PND 2 displays on the display unit 14 a map image or the like generated from map data stored in a storage unit (not illustrated) included therein.

1-2. Circuit Configuration of PND

Figure 2:
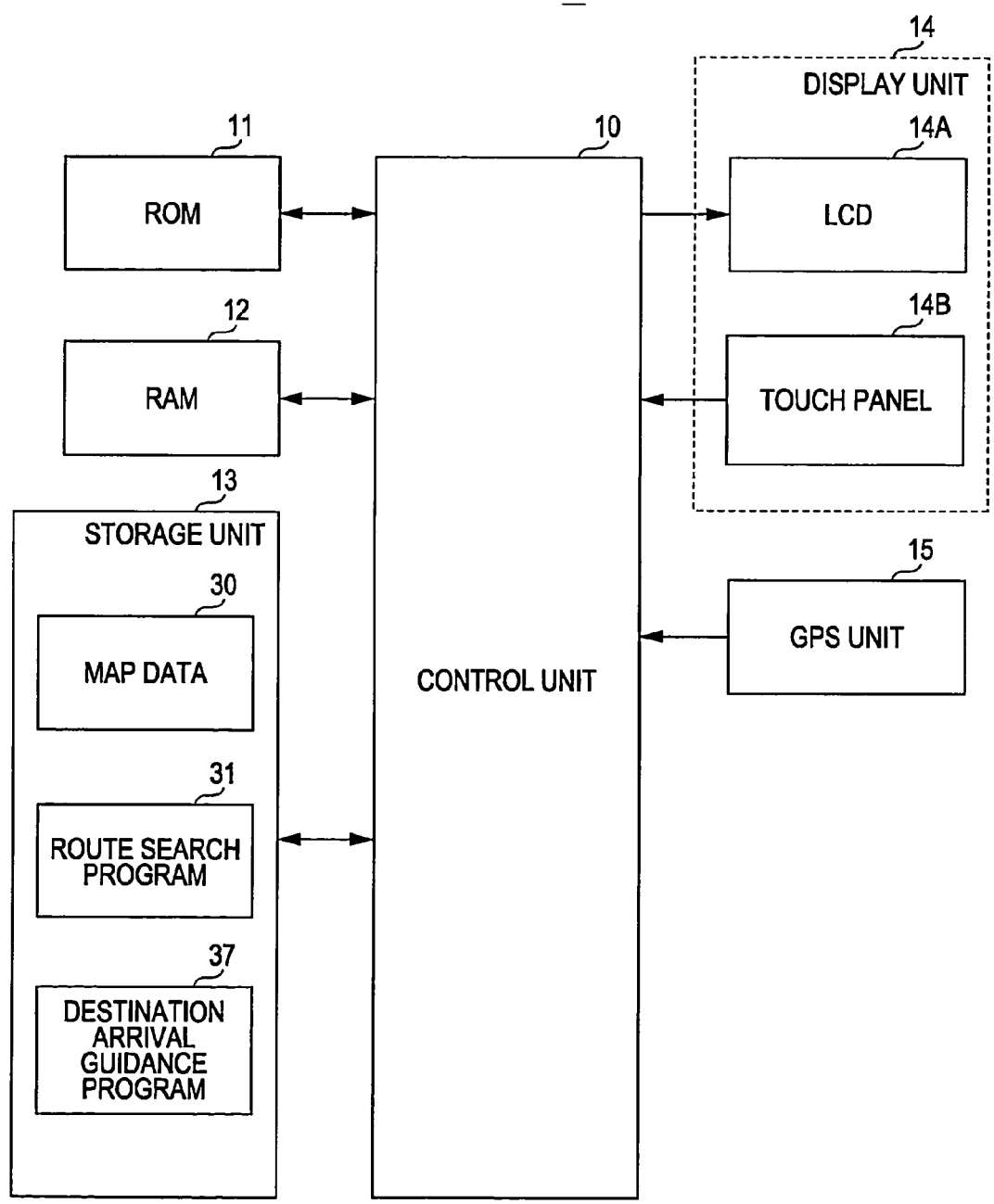
FIG. 2 is a schematic block diagram illustrating a circuit configuration of a PND according to the first embodiment.

As illustrated in FIG. 2, the PND 2 includes a control unit 10 having a configuration of a Central Processing Unit (CPU). The control unit 10 decompresses a basic program stored in a Read-Only Memory (ROM) 11 into a Random Access Memory (RAM) 12, and performs overall control in accordance with the basic program.

The control unit 10 included in the PND 2 decompresses various application programs such as a route search program 31 and a destination arrival guidance program 32 stored in the storage unit 13 into the RAM 12 and performs various processing operations including navigation processing in accordance with these application programs.

The PND 2 includes a Global Positioning System (GPS) unit 15. The GPS unit 15 accurately measures the current position of a vehicle on the basis of orbital data obtained by receiving satellite signals from a plurality of GPS satellites and demodulating these satellite signals and data of a distance between each of these GPS satellites and the vehicle, thereby obtaining GPS information including current position information represented by a latitude and a longitude and time information included in the satellite signals. The GPS unit 15 supplies the GPS information to the control unit 10.

Map data 30 is stored in the storage unit 13. In addition, various application programs such as the route search program 31 and the destination arrival guidance program 32 are installed in the storage unit 13 in advance.

The map data 30 includes road data for display, road data for route search, pieces of building data concerning positions of various facilities and various buildings, etc. Each of these pieces of data is represented by a set of coordinates (represented by a latitude and a longitude) of nodes and links between nodes.

The control unit 10 reads vicinity map data including data of the current position of a vehicle from the map data 30 stored in the storage unit 13 into the RAM 12 on the basis of the GPS information. Subsequently, the control unit 10 generates a map image including the current position of the vehicle on the basis of the read vicinity map data and displays the map image on a Liquid Crystal Display (LCD) 14A included in the display unit 14.

A touch panel 14B for receiving a touch operation performed by a user is disposed on the surface of the display unit 14. When a destination is set by a touch operation of the touch panel 14B, the control unit 10 searches for a route from the current position to the destination in accordance with the route search program 31 stored in the storage unit 13, generates retrieved route information, and stores the retrieved route information in the RAM 12.

The route search program 31 is able to allow a user to set not only a destination but also a way point on a route to a destination and various conditions for the reduction in a travel distance, the reduction in a travel time, and the reduction in payment of a toll for using a road.

The retrieved route information is represented by data of a sequence of all nodes on the route from a starting point to a destination retrieved by the control unit 10.

The control unit 10 outputs to the LCD 14A a route guidance screen (to be described later) on which the retrieved route is displayed with a color different from that of other roads or a line of a width larger than a line width of other roads so as to cause the LCD 14A to display the route guidance screen.

At that time, the control unit 10 not only causes the LCD 14A to display the route guidance screen on which the retrieved route is displayed but also generates sound information used to guide or support driving by a user (used for route guidance) while a vehicle travels to a destination by the retrieved route. The control unit 10 causes a speaker (not illustrated) to output the sound information as navigation sound at the time of route guidance.

Thus, the PND 2 can provide a navigation function of navigating a vehicle to a destination desired by a user.

The control unit 10 included in the PND 2 decompresses the destination arrival guidance program 32 stored in the storage unit 13 into the RAM 12 and performs a destination arrival guidance process (to be described later), thereby guiding a user to a destination with certainty without confusing the user.

1-3. Destination Arrival Guidance Process

Figure 3:
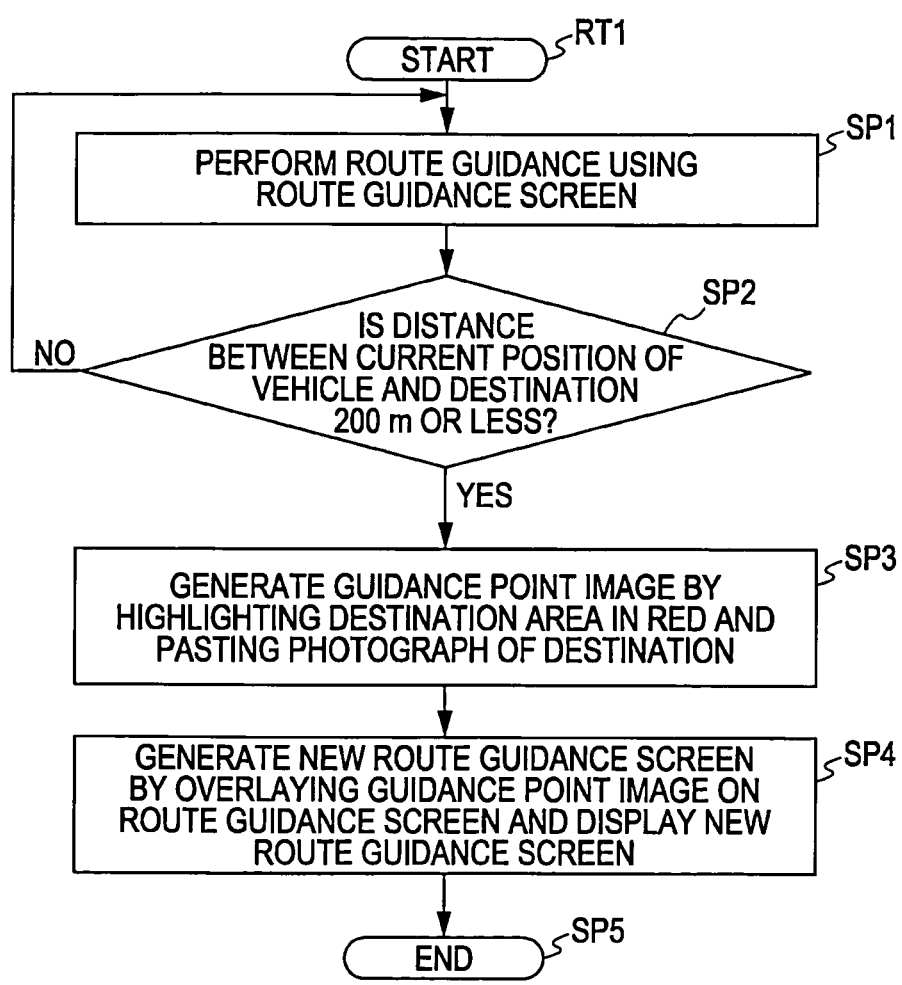
FIG. 3 is a flowchart illustrating a destination arrival guidance process according to the first embodiment.

As illustrated in FIG. 3, the control unit 10 included in the PND 2 enters a starting step of a routine RT1 in accordance with the destination arrival guidance program 32. In step SP1, the control unit 10 included in the PND 2 performs route guidance using a route guidance screen on which a route from a current position to a destination retrieved in accordance with the route search program 31 is displayed. Subsequently, the process proceeds to step SP2.

Figure 4A:
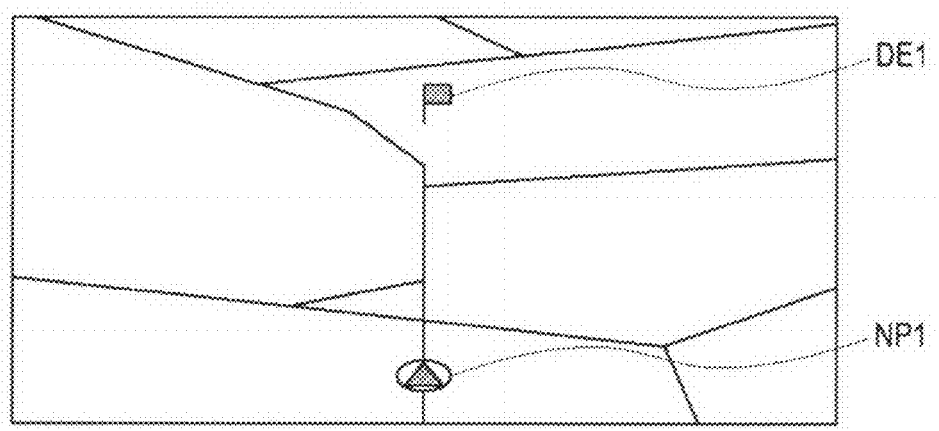
FIGS. 4A and 4B are schematic diagrams illustrating route guidance screens according to the first embodiment.

In this case, as illustrated in FIG. 4A, for example, the control unit 10 displays a flag mark DE1 indicating a destination and a vehicle mark NP1 indicating the current position of a user's own vehicle on a route guidance screen MG1 displayed on the display unit 14 on a predetermined scale. The vehicle mark NP1 is displayed such that it is on the retrieved route on the near side of the flag mark DE1.

As a result, the control unit 10 performs route guidance by allowing a user to visually check the vehicle mark NP1 traveling to a destination represented by the flag mark DE1 on the route guidance screen MG1.

In step SP2, the control unit 10 determines whether a remaining distance between the current position of the vehicle and the destination is, for example, 200 m or less. In a case where a negative result is obtained in step SP2, it is determined that the distance between the current position of the vehicle and the destination is 200 m or more and the current position of the vehicle is far from the destination. At that time, the process returns to step SP1.

On the other hand, if a positive result is obtained in step SP2, it is determined that the remaining distance between the current position of the vehicle and the destination is 200 m or less and the vehicle will arrive at the destination soon. At that time, the process proceeds to step SP3.

Figure 4B:
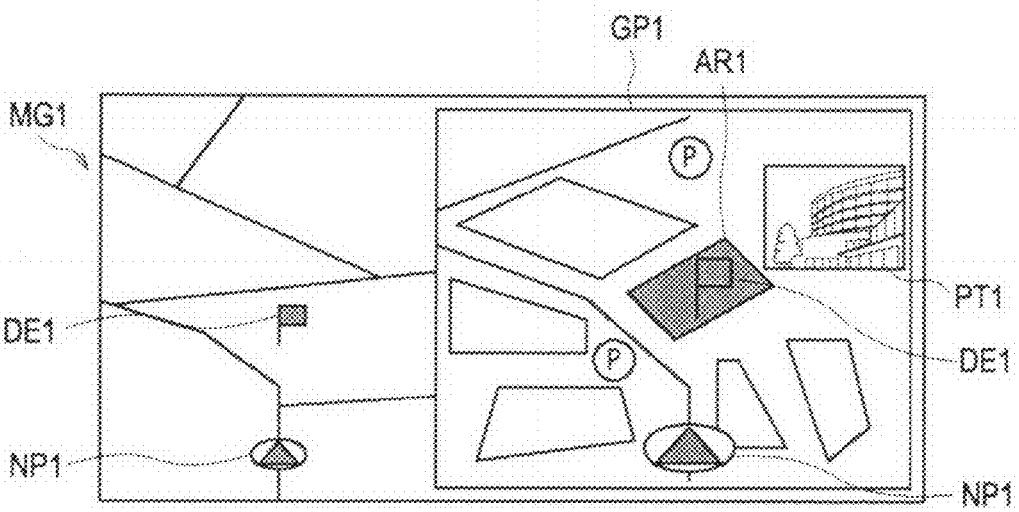

In step SP3, the control unit 10 highlights in red an destination area AR1 (that is diagonally shaded) in which the destination represented by the flag mark DE1 is located as illustrated in FIG. 4B, and pastes an external photograph PT1 of, for example, a destination building next to the destination area AR1, thereby generating a guidance point image GP1. Subsequently, the process proceeds to step SP4.

The guidance point image GP1 is displayed on a scale larger than that used for display of the route guidance screen MG1. In the guidance point image GP1, not only the destination area AR1 in which the destination represented by the flag mark DE1 is located but also the vicinity of the destination area AR1 are displayed in detail, and the vehicle mark NP1 is also displayed. Accordingly, a user can intuitively recognize the positional relationship between the flag mark DE1 and the vehicle mark NP1 using the guidance point image GP1.

Furthermore, since the external photograph PT1 of the destination building is displayed near the destination area AR1 in which the flag mark DE1 is located in the guidance point image GP1, a user can visually check which of a plurality of buildings is the destination building with certainty.

In step SP4, the control unit 10 generates a new route guidance screen MG2 by overlaying the guidance point image GP1 generated in step SP3 on the route guidance screen MG1 (see, FIG. 4A) and displays the route guidance screen MG2 on the display unit 14. Subsequently, the process proceeds to step SP5 in which the process ends.

1-4. Operation and Effect

Thus, when the remaining distance between the current position of a vehicle and a destination is 200 m or less and the vehicle is near the destination while the control unit 10 included in the PND 2 performs route guidance using the flag mark DE1 indicating the destination and the vehicle mark NP1 indicating the current position of the vehicle displayed on the route guidance screen MG1, the control unit displays the route guidance screen MG2 obtained by overlaying the guidance point image GP1 on the route guidance screen MG1.

As a result, since the control unit 10 allows a user to easily recognize the positional relationship between the vehicle mark NP1 and the destination area AR1 highlighted in red using the guidance point image GP1, the control unit 10 allows the user to roughly grasp the distance between the current position of the vehicle and the destination and to intuitively understand which of buildings is the destination.

Furthermore, since the control unit 10 allows a user to compare the external appearance of an actual destination building and the external appearance of a building displayed in the external photograph PT1 of the destination pasted next to the destination area AR1 using the guidance point image GP1, the control unit 10 can guide the user to the destination building with certainty without allowing the user to mistake the destination building for another building.

Thus, since the control unit 10 allows a user to recognize the positional relationship between the vehicle mark NP1 and the destination area AR1 highlighted in red using the guidance point image GP1 and to accurately understand a destination building using the external photograph PT1 of the destination pasted next to the destination area AR1, the control unit 10 can guide the user to the destination building with certainty.

2. Second Embodiment

2-1. Configuration of Navigation System

Figure 5:
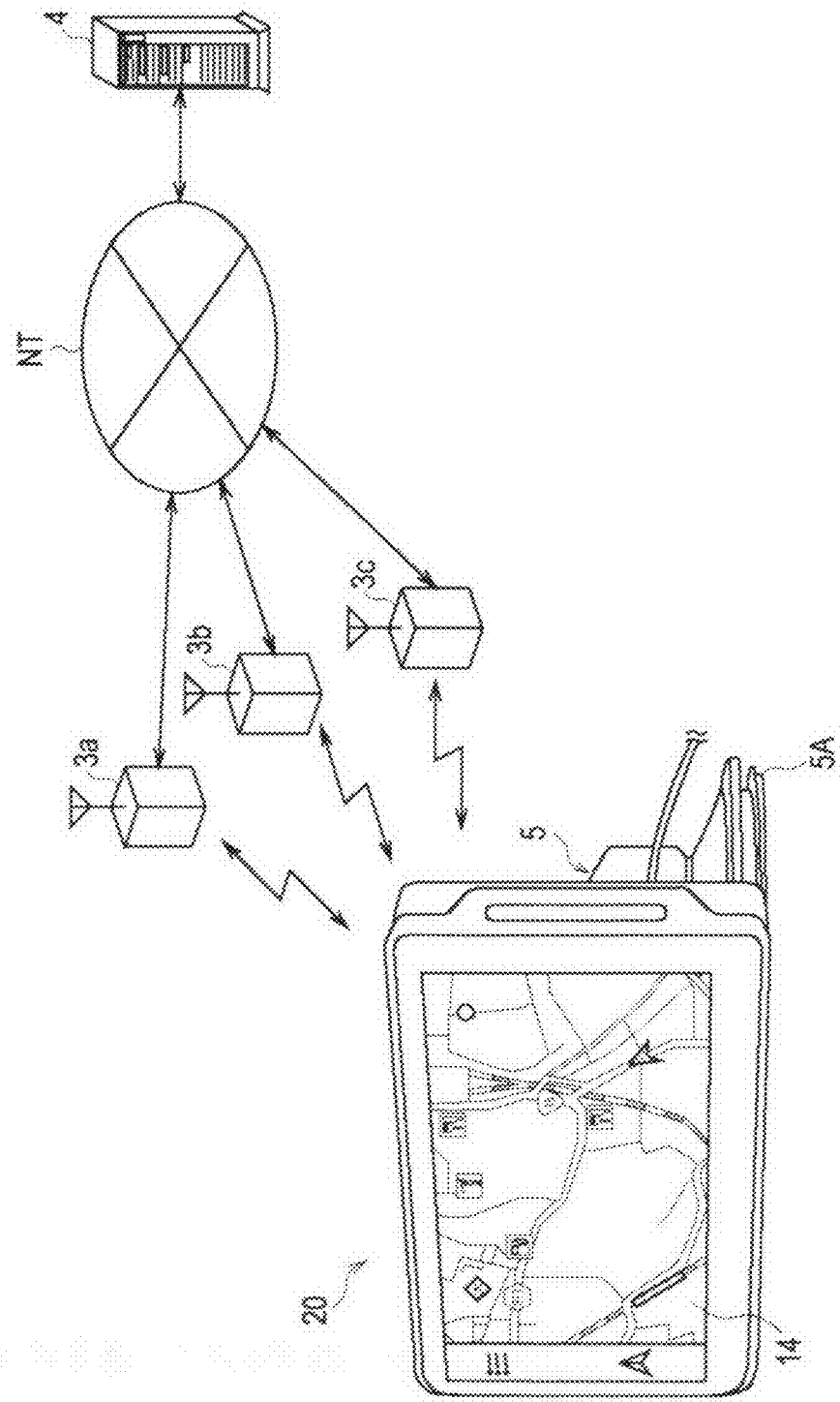
FIG. 5 is a schematic perspective view illustrating an entire configuration of a navigation system according to a second embodiment of the present invention.

FIG. 5, is a diagram illustrating a navigation system 1 according to the second embodiment of the present invention. In the drawing, the same reference numerals are used for components having the same functions as those of components illustrated in FIG. 1. The navigation system 1 includes a PND 20 having a basic configuration similar to that of the PND 2 according to the first embodiment, a plurality of wireless access points 3a, 3b, 3c, . . . , and a server 4.

When the PND 20 is wirelessly connected to one of the wireless access points 3a, 3b, 3c, . . . , the PND 20 is connected to the server 4 via the wireless access point and the Internet NT.

Like in the first embodiment, the cradle 5 disposed on the back surface of the PND 20 is attached to a vehicle's dashboard with the suction cup 5A and is electrically connected to a vehicle's battery.

The PND 20 is attached/removed to/from a vehicle with the cradle 5. When the PND 20 is attached to a vehicle, the PND 20 is held by the cradle 5 and is mechanically and electrically connected to the cradle 5.

As a result, the PND 20 operates with power supplied from the vehicle's battery via the cradle 5. When the PND 20 is removed from the cradle 5, the PND 20 operates with power supplied from an internal battery.

The display unit 14 is disposed on the front surface of the PND 20. The PND 20 displays on the display unit 14 a map image or the like generated from map data stored in a storage unit (not illustrated) included therein.

2-2. Circuit Configuration of PND

Figure 6:
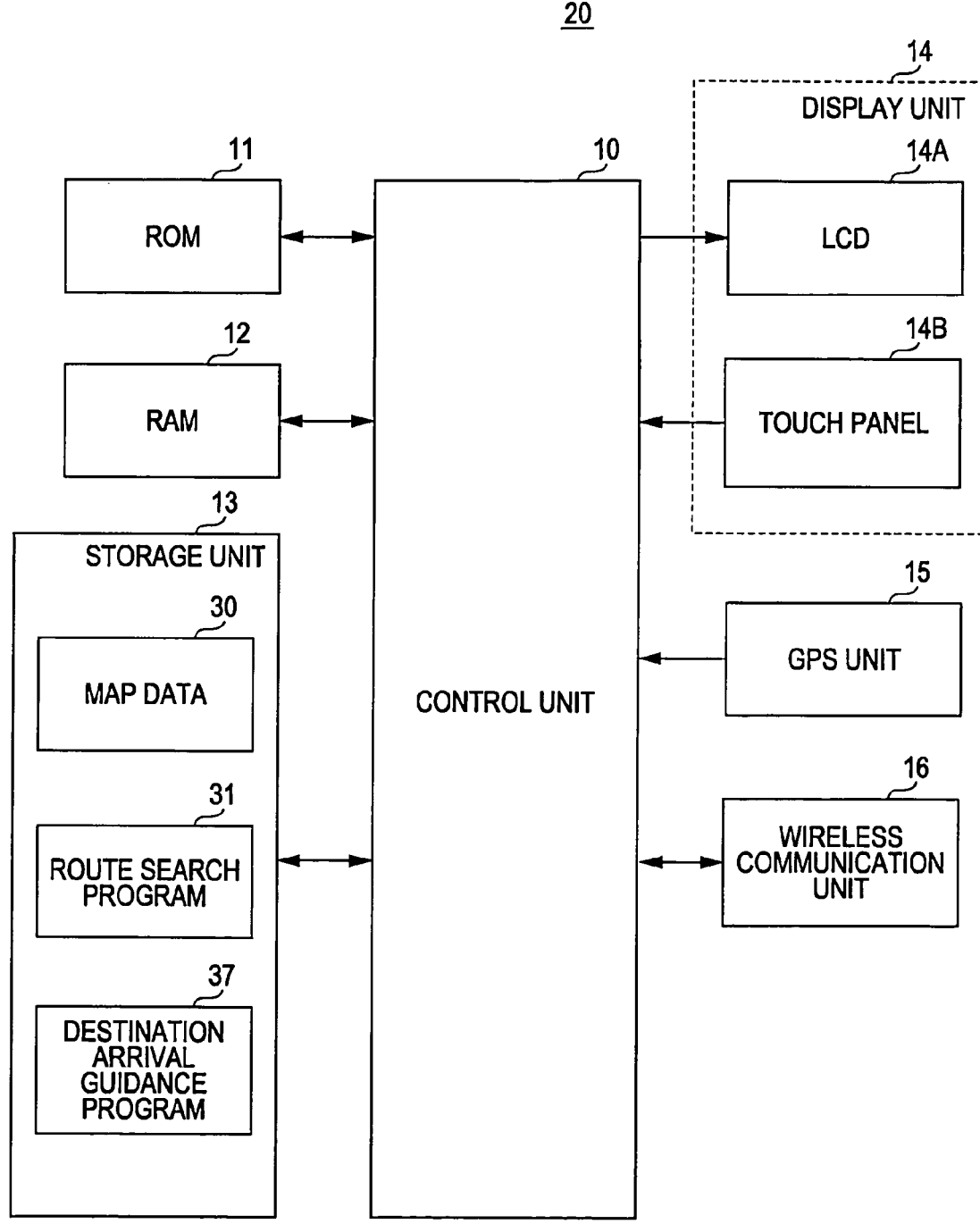
FIG. 6 is a schematic block diagram illustrating a circuit configuration of a PND according to the second embodiment.

As illustrated in FIG. 6 in which the same reference numerals are used for components having the same functions as those of components illustrated in FIG. 2, the PND 20 has a basic configuration similar to that of the PND 2 according to the first embodiment except for a wireless communication unit 16.

The control unit 10 included in the PND 20 decompresses a basic program stored in the ROM 11 into the RAM 12 and performs overall control processing. Furthermore, the control unit 10 decompresses various application programs stored in the storage unit 13 into the RAM 12 and performs various processing operations including navigation processing.

The GPS unit 15 included in the PND 20 accurately measures the current position of a vehicle on the basis of orbital data obtained by receiving satellite signals from a plurality of GPS satellites and demodulating these satellite signals and data of a distance between each of these GPS satellites and the vehicle, thereby obtaining GPS information including current position information and time information. The GPS unit 15 supplies the GPS information to the control unit 10.

The control unit 10 reads vicinity map data including data of the current position of a vehicle from the map data 30 stored in the storage unit 13 into the RAM 12 on the basis of the GPS information. Subsequently, the control unit 10 generates a map image including the current position of the vehicle on the basis of the read vicinity map data and displays the map image on the LCD 14A included in the display unit 14.

When a destination is set by a touch operation of the touch panel 14B included in the display unit 14, the control unit 10 searches for a route from the current position to the destination in accordance with the route search program 31 stored in the storage unit 13, generates retrieved route information, and stores the retrieved route information in the RAM 12.

The control unit 10 outputs to the LCD 14A the route guidance screen MG1 (see, FIG. 4A) on which the retrieved route is displayed with a color different from that of other roads or a line of a width larger than a line width of other roads so as to cause the LCD 14A to display the route guidance screen MG1.

At that time, the control unit 10 not only causes the LCD 14A to display the route guidance screen MG1 on which the retrieved route is displayed but also causes a speaker (not illustrated) to output sound information used to guide or support driving by a user (used for route guidance) as navigation sound while a vehicle travels to a destination by the retrieved route.

Thus, the PND 20 can also provide a navigation function of navigating a vehicle to a destination desired by a user.

The PND 20 includes the wireless communication unit including, for example, a WI-FI (registered trademark) module. The PND 20 retrieves the wireless access points 3a to 3c (see, FIG. 5) with which the wireless communication unit 16 can wirelessly communicate.

When the PND 20 retrieves the wireless access points 3a to 3c with which the wireless communication unit 16 can wirelessly communicate, the wireless communication unit 16 is wirelessly connected to the server 4 via the retrieved wireless access points 3a to 3c and the Internet NT.

The control unit 10 included in the PND 20 decompresses a destination arrival guidance program 37 stored in the storage unit 13 into the RAM 12 and performs a destination arrival guidance process (to be described later), thereby guiding a user to a destination with certainty without confusing the user.

2-3. Circuit Configuration of Server

Figure 7:
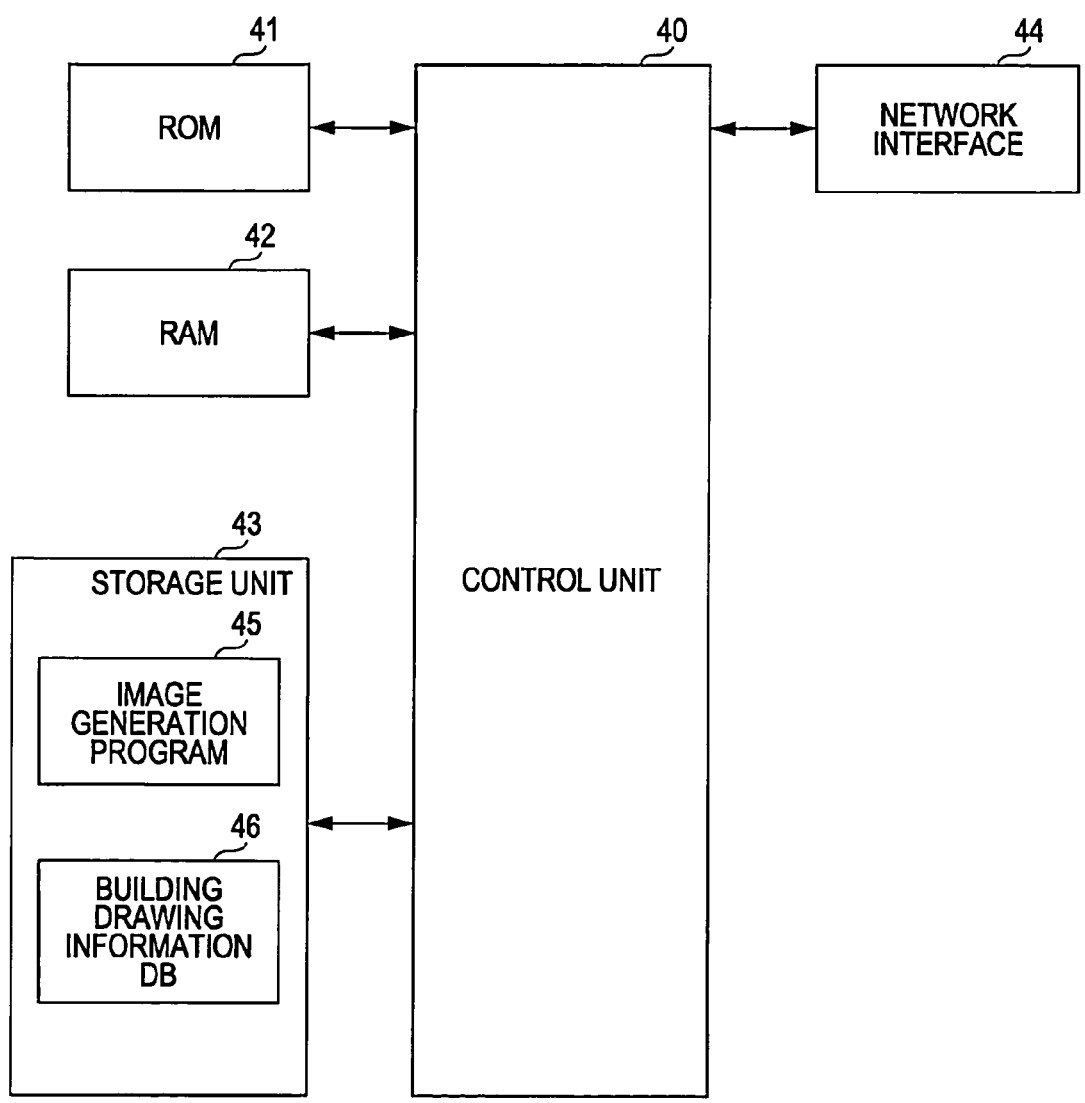
FIG. 7 is a schematic block diagram illustrating a circuit configuration of a server according to the second embodiment.

As illustrated in FIG. 7, the server 4 includes a control unit 40 having a CPU configuration. The control unit 40 decompresses a basic program stored in a ROM 41 into a RAM 42 and performs overall control in accordance with the basic program.

The control unit 40 included in the server 4 decompresses various application programs stored in the storage unit 43 into the RAM 42 and generates in accordance with these application programs a three-dimensional guidance point image (to be described later) used to support a destination arrival guidance process performed by the PND 20.

A storage unit 43 stores an image generation program 45 used to generate a three-dimensional guidance point image and a building drawing information database 46.

The control unit 40 communicates with the PND 20 via a network interface 44 so as to transmit to the PND 20, for example, a three-dimensional guidance point image.

2-4. Destination Arrival Guidance Process

Figure 8:
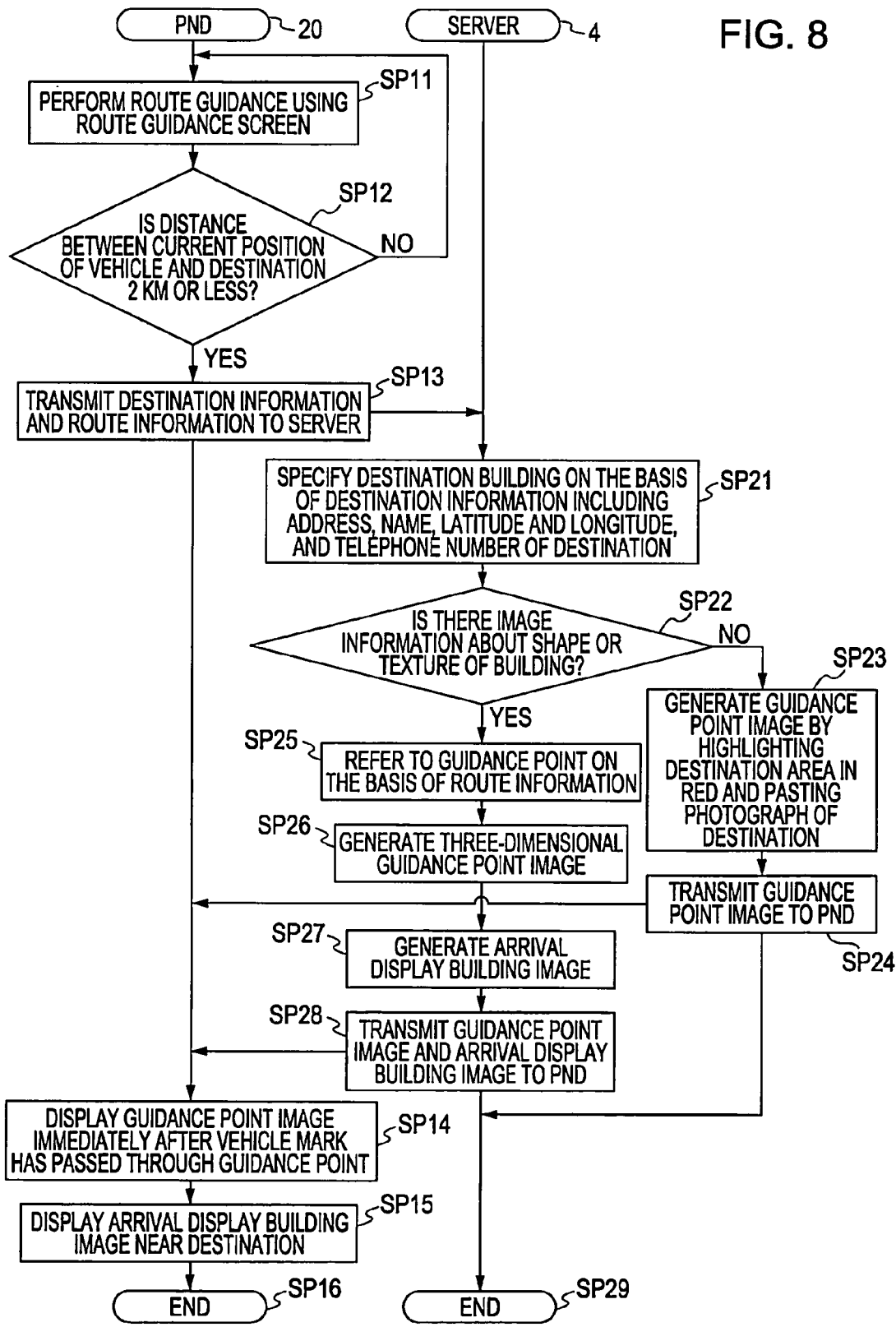
FIG. 8 is a flowchart illustrating a destination arrival guidance process according to the second embodiment.
Figure 9A:
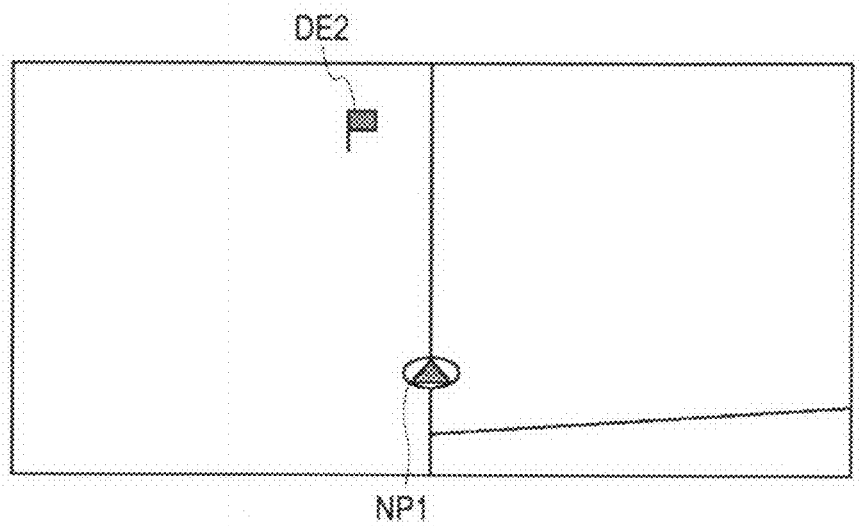
FIGS. 9A and 9B are schematic diagrams illustrating route guidance screens according to the second embodiment.

As illustrated in FIG. 8, in the navigation system 1, the control unit 10 included in the PND 20 generates a route guidance screen MG3 illustrated in FIG. 9A in accordance with the route search program 31 and performs route guidance for a route from a current position to a destination using the route guidance screen MG3 in step SP11. Subsequently, the process proceeds to step SP12.

In this case, the control unit 10 included in the PND 20 displays a flag mark DE2 indicating a destination and the vehicle mark NP1 indicating the current position of a vehicle on the route guidance screen MG3 (see, FIG. 9A) displayed on the display unit 14. The vehicle mark NP1 is displayed such that it is on a retrieved route on the near side of the flag mark DE2.

As a result, the control unit 10 included in the PND 20 performs route guidance while allowing a user to visually check the vehicle mark NP1 traveling to a destination represented by the flag mark DE2 on the route guidance screen MG3.

In step SP12, the control unit 10 included in the PND 20 determines whether a remaining distance between the current position of the vehicle and the destination is, for example, 2 km or less. In a case where a negative result is obtained in step SP12, it is determines that the distance between the current position of the vehicle and the destination is 2 km or more and the current position of the vehicle is far from the destination. At that time, the process returns to step SP11.

On the other hand, if a positive result is obtained in step SP12, it is determined that the distance between the current position of the vehicle and the destination is 2 km or less and the current position of the vehicle is near the destination. At that time, the process proceeds to step SP13.

In step SP13, the control unit 10 included in the PND 20 wirelessly transmits from the wireless communication unit 16 to the server 4 destination information about a destination for which route guidance is being performed using the route guidance screen MG3 and route information indicating a retrieved route from a starting point to the destination. At that time, the process proceeds to step SP14.

At that time, in step SP21, the control unit 40 included in the server 4 recognizes the address, name, latitude and longitude, and telephone number of the destination on the basis of the destination information received from the PND 20 and specifies a specific building located at the destination on the basis of a result of the recognition. Subsequently, the process proceeds to step SP22.

In step SP22, the control unit 40 included in the server 4 determines whether the building drawing information database 46 stores image information about the shape or texture of the building specified in step SP22 which is used to express a three-dimensional shape.

If a negative result is obtained in step SP22, it is determined that the image information used to three-dimensionally display a building is not stored in the building drawing information database 46. Subsequently the process proceeds to step SP23.

Figure 9B:
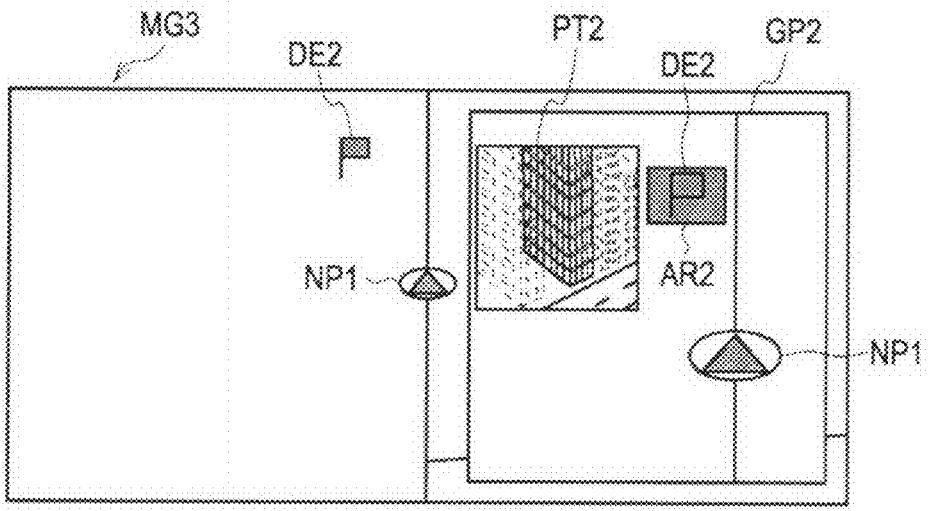

In step SP23, the control unit 40 included in the server 4 highlights in red a destination area AR2 in which the destination represented by the flag mark DE2 is located as illustrated in FIG. 9B, and pastes an external photograph PT2 of, for example, a destination building next to the destination area AR2, thereby generating a guidance point image GP2. Subsequently, the process proceeds to step SP24.

The guidance point image GP2 (see, FIG. 9B) is displayed on a scale larger than that used for display of the route guidance screen MG3 (see, FIG. 9A). In the guidance point image GP2, not only the destination area AR2 in which the destination represented by the flag mark DE2 is located but also the vicinity of the destination area AR2 are displayed in detail, and the vehicle mark NP1 is also displayed.

Accordingly, the navigation system 1 allows a user to intuitively recognize the positional relationship between the flag mark DE2 and the vehicle mark NP1 using the guidance point image GP2.

Furthermore, since the external photograph PT2 of the destination building is displayed near the destination area AR2 in which the flag mark DE2 is located in the guidance point image GP2, a user can visually check which of a plurality of buildings is the destination building with certainty.

In step SP24, the control unit 40 included in the server 4 wirelessly transmits the guidance point image GP2 generated in step SP23 to the PND 20 via the network interface 44. Subsequently, the process proceeds to step SP29 in which the process ends.

On the other hand, if a positive result is obtained in step SP22, it is determined that the image information used to three-dimensionally display a building is stored in the building drawing information database 46. At that time, the process proceeds to step SP25.

In step SP25, the control unit 40 included in the server 4 refers to a guidance point used when the PND 20 causes a speaker to output navigation sound on the basis of the route information received from the PND 20. Subsequently, the process proceeds to step SP26.

Figure 10:
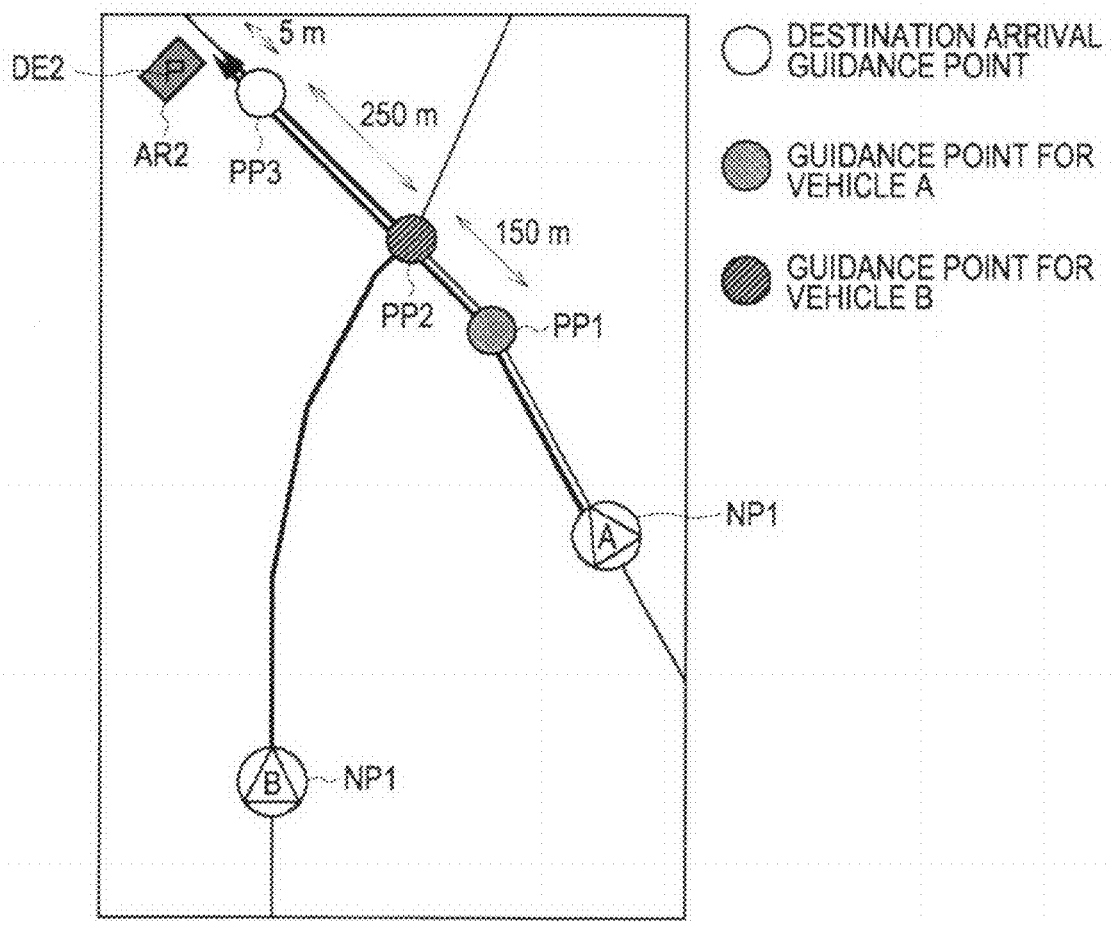
FIG. 10 is a schematic diagram describing a guidance point.

Here, as illustrated in FIG. 10, the control unit 10 included in the PND 20 sets, for example, a position 400 m before the destination area AR2 in which the destination building is located as a guidance point at which, for example, navigation sound "You are 400 m before the destination" is output.

More specifically, the control unit 10 sets a position 400 m before the destination area AR2 as a guidance point PP1 for a vehicle A traveling along a road.

The guidance point PP1 is used as a position functioning as a trigger for display of a guidance point image (to be described later) which is performed by the control unit 10 included in the PND 20 immediately after the vehicle A has passed through the guidance point PP1.

For a vehicle B traveling on a road on which a right-turning or left-turning intersection is located at a position 250 m before the destination area AR2 in which the destination building is located, the control unit 10 included in the PND 20 sets the right-turning or left-turning intersection as a guidance point PP2 at which, for example, navigation sound "You are 250 m before the destination" is output from a speaker.

The guidance point PP2 is also used as a position functioning as a trigger for display of a guidance point image (to be described later) which is performed by the control unit 10 included in the PND 20 immediately after the vehicle B has passed through the guidance point PP2.

Here, if the distance between the destination area AR2 and the guidance point PP2 is, for example, 50 m or less, the control unit 10 included in the PND 20 sets a usual guidance point before the guidance point PP2 as the guidance point for the vehicle B since it is too late to display a guidance point image (to be described later) immediately after the vehicle B has passed through the guidance point PP2.

In step SP26, the control unit 40 included in the server 4 generates a three-dimensional guidance point image (to be described later) to be displayed by the PND 20 immediately after a vehicle has passed through the guidance point PP1 or PP2. Subsequently, the process proceeds to step SP27.

Figure 11A:
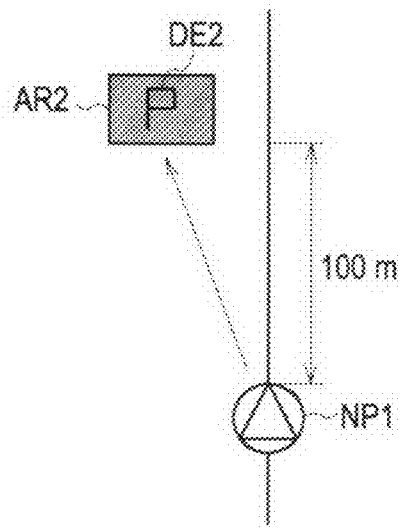
FIGS. 11A and 11B are schematic diagrams illustrating a guidance point image generation concept.

As illustrated in FIG. 11A, the control unit 40 included in the server 4 estimates an angle at which a user views the destination building at a position 100 m before the destination area AR2.

Figure 11B:
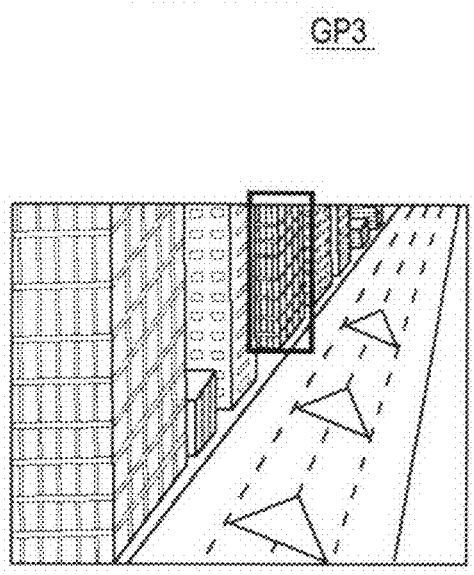

The control unit 40 included in the server 4 generates a guidance point image GP3 illustrated in FIG. 11B on the basis of the image information stored in the building drawing information database 46 included in the storage unit 43. In the guidance point image GP3, a building image is highlighted such that a three-dimensional appearance is applied to buildings when the buildings are viewed at the estimated angle.

In step SP27, the control unit 40 included in the server 4 assumes that the PND 20 sets, for example, a position 5 m before the destination area AR2 as a destination arrival guidance point PP3 as illustrated in FIG. 10, and generates a building image to be displayed at the time of arrival (to be described later) in accordance with the image generation program 45. Subsequently, the process proceeds to step SP28.

Figure 12A:
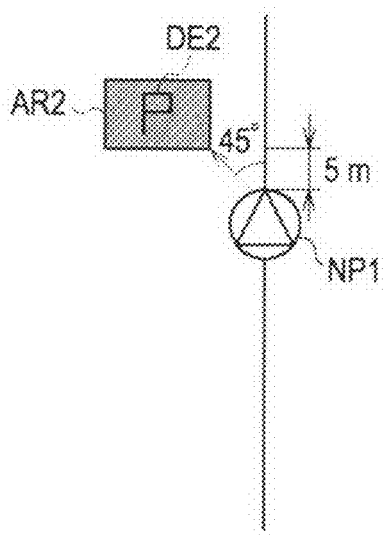
FIGS. 12A and 12B are schematic diagrams illustrating an arrival display building image generation concept.

At that time, the control unit 40 included in the server 4 estimates that an angle at which a user views the destination building from a position 5 m before the destination area AR2 in which the destination building is located is approximately 45° as illustrated in FIG. 12A.

Figure 12B:
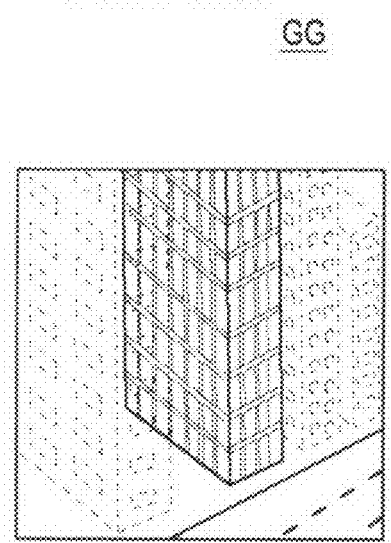

The control unit 40 included in the server 4 generates a building image GG to be displayed at the time of arrival (hereinafter referred to as an arrival display building image GG) illustrated in FIG. 12B on the basis of the image information stored in the building drawing information database 46 included in the storage unit 43. In the arrival display building image GG, a building image is highlighted such that a three-dimensional appearance is applied to buildings when the buildings are viewed at the estimated angle.

If another building overlapping the destination is present, the control unit 40 included in the server 4 generates the arrival display building image GG that is a three-dimensional building image of only the destination as if the building overlapping the destination were not present.

In step S28, the control unit 40 included in the server 4 wirelessly transmits the guidance point image GP3 generated in step SP26 and the arrival display building image GG generated in step SP27 to the PND 20 via the network interface 44. Subsequently, the process proceeds to step SP29 in which the process ends.

If the guidance point image GP2 is transmitted from the server 4 to the control unit 10 included in the PND 20 in step SP24, the control unit 10 generates a new route guidance screen MG4 by overlaying the guidance point image GP2 on the route guidance screen MG3 and displays the route guidance screen MG4 on the display unit 14 immediately after the vehicle mark NP1 has passed through the guidance point PP1 or PP2 in step SP14. Subsequently, the process proceeds to step SP15.

Figure 13:
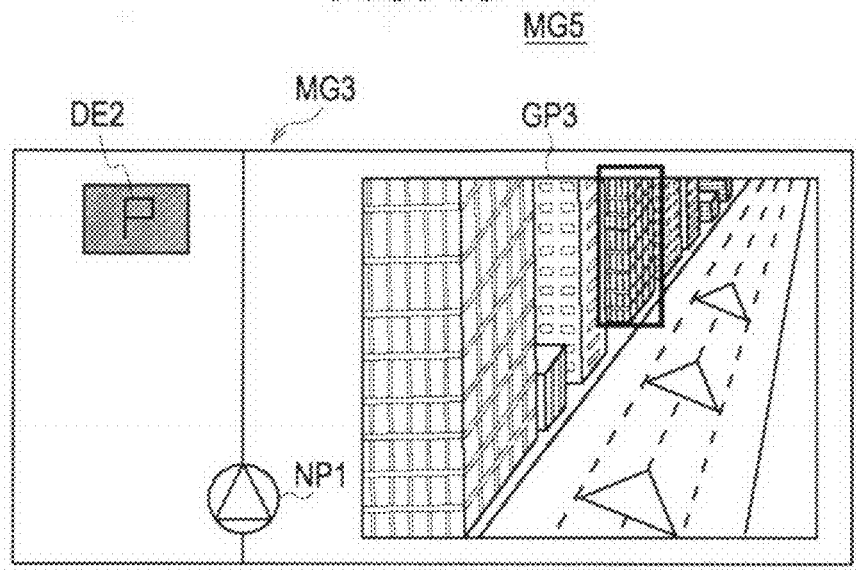
FIG. 13 is a schematic diagram illustrating a route guidance screen displayed immediately after passage through a guidance point.

If the guidance point image GP3 and the arrival display building image GG are transmitted from the server 4 to the control unit 10 included in the PND 20 in step SP28, the control unit 10 generates a new route guidance screen MG5 by overlaying the guidance point image GP3 on the route guidance screen MG3 as illustrated in FIG. 13 and displays the route guidance screen MG5 on the display unit 14 immediately after the vehicle mark NP1 has passed through the guidance point PP1 or PP2 in step SP14. Subsequently, the process proceeds to step SP15.

Figure 14:
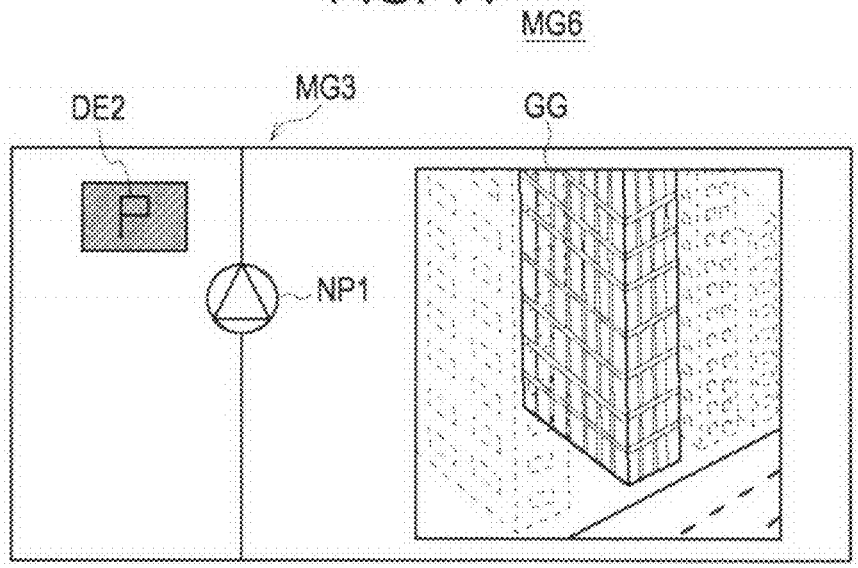
FIG. 14 is a schematic diagram illustrating a route guidance screen displayed near a destination.

In step SP15, when the vehicle mark NP1 arrives at the destination arrival guidance point PP3 5 m before the destination area AR2, the control unit 10 included in the PND 20 generates a new route guidance screen MG6 by overlaying the arrival display building image GG on the route guidance screen MG3 as illustrated in FIG. 14 and displays the route guidance screen MG6 on the display unit 14. Subsequently, the process proceeds to step SP16 in which the process ends.

2-5. Operation and Effect

Thus, if the remaining distance between the current position of a vehicle represented by the vehicle mark NP1 and a destination represented by the flag mark DE2 is 2 km or less while the PND 20 included in the navigation system 1 performs route guidance using the route guidance screen MG3, the PND 20 transmits destination information and route information to the server 4.

The server 4 specifies a building located at the destination represented by the flag mark DE2 on the basis of the destination information transmitted from the PND 20. If image information used to three-dimensionally display the building is stored in the building drawing information database 46, the server 4 generates the guidance point image GP3 to be displayed by the PND 20 immediately after a vehicle has passed through the guidance point PP1 or PP2.

Furthermore, the server 4 generates the arrival display building image GG to be viewed by a user at the time of arrival at the destination arrival guidance point PP3 that is, for example, 5 m before the destination area AR2 on the basis of the image information stored in the building drawing information database 46.

Subsequently, the server 4 transmits the guidance point image GP3 and the arrival display building image GG to the PND 20 so as to cause the PND 20 to display the route guidance screen MG5 on which the guidance point image GP3 is pasted immediately after a vehicle has passed through the guidance point PP1 or PP2 and then to display the route guidance screen MG6 on which the arrival display building image GG is pasted at the destination arrival guidance point PP3 5 m before the destination area AR2.

As a result, since the PND 20 allows a user to visually check the three-dimensional image of a destination building to be actually viewed by the user using the guidance point image GP3 immediately after the user's vehicle has passed through the guidance point PP1 or PP2 that is 400 m or less before the destination area AR2, the PND 20 can prevent the user from passing through the destination building.

Furthermore, since the PND 20 allows a user to visually check the arrival display building image GG that is the same as the external appearance of a destination building to be viewed by the user at the time of arrival at the guidance point PP3, the PND 20 can guide the user to the destination building with certainty.

Since the PND 20 can receive from the server 4 the guidance point image GP3 and the arrival display building image GG only by transmitting destination information and route information to the server 4, it is not necessary for the PND 20 to store the image generation program 45 and the building drawing information database 46. Accordingly, the configuration of the PND 20 can be simplified.

Thus, in the navigation system 1, the PND 20 expresses the external appearance of a destination building to be viewed by a user using the guidance point image GP3 after a vehicle has passed through the guidance point PP1 or PP2 and using the arrival display building image GG at the time of arrival at the destination arrival guidance point PP3, and allows the user to visually check the guidance point image GP3 and the arrival display building image GG. As a result, the PND 20 can guide the user to the destination building with certainty.

3. Other Embodiments

In the first embodiment, the control unit 10 included in the PND 2 generates the route guidance screen MG2 by overlaying the guidance point image GP1 on the route guidance screen MG1. However, the control unit 10 included in the PND 2 may display only the guidance point image GP1 instead of the route guidance screen MG1.

In the second embodiment, the control unit 10 included in the PND 20 generates the route guidance screen MG5 by overlaying the guidance point image GP3 on the route guidance screen MG3. However, the control unit 10 included in the PND 20 may display only the guidance point image GP3 instead of the route guidance screen MG3.

In the second embodiment, the control unit 10 included in the PND 20 generates the route guidance screen MG6 by overlaying the arrival display building image GG on the route guidance screen MG3. However, the control unit 10 included in the PND 20 may display only the arrival display building image GG instead of the route guidance screen MG3.

In the first embodiment, the control unit 10 included in the PND 2 highlights only the destination area AR1 in red. However, the control unit 10 included in the PND 2 may display, for example, an area at an intersection on the near side of the area AR1 in another color so as to remind a user to turn to the right/left.

In the second embodiment, the PND 20 receives the guidance point image GP2 and the arrival display building image GG generated by the server 4 and displays them. However, the control unit 10 included in the PND 20 may have the image generation program 45 and the building drawing information database 46, generate the guidance point image GP2 and the arrival display building image GG, and display them.

In the second embodiment, in the guidance point image GP3 and the arrival display building image GG, the image of a building is highlighted such that a three-dimensional appearance is applied to the building. However, the control unit 10 included in the PND 20 may highlight the three-dimensional image of the building in red in accordance with the image generation program 45 and the building drawing information database 46.

In the first embodiment, the control unit 10 included in the PND 2 performs the destination arrival guidance process (see, FIG. 3) of the routine RT1 in accordance with the destination arrival guidance program 32. However, the control unit 10 included in the PND 2 may perform the destination arrival guidance process of the routine RT1 in accordance with the destination arrival guidance program 32 that is installed from a predetermined recording medium, is downloaded from the Internet, or is installed by another route.

In the second embodiment, the control unit 10 included in the PND 20 performs the process from step SP11 to step SP16 (see, FIG. 8) in accordance with the destination arrival guidance program 37. However, the control unit 10 included in the PND 20 may perform the process from step SP11 to step SP16 in accordance with the destination arrival guidance program 37 that is installed from a predetermined recording medium, is downloaded from the Internet, or is installed by another route.

In the second embodiment, the control unit 40 included in the server 4 performs the process from step SP21 to step SP29 (see, FIG. 8) in accordance with the image generation program 45. However, the control unit 40 included in the server 4 may perform the process from step SP21 to step SP29 in accordance with the image generation program 45 that is installed from a predetermined recording medium, is downloaded from the Internet, or is installed by another route.

In the first and second embodiments, a navigation apparatus according to the present invention includes the GPS unit 15 corresponding to positioning means, the control unit 10 corresponding to route guidance screen generating means, and the control unit 40 corresponding to guidance image generating means. However, a navigation apparatus may include positioning means, route guidance screen generating means, and guidance image generating means each of which has another configuration.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
   a route guidance screen generating unit configured to generate a route guidance screen used for route guidance for a retrieved route from a current position measured by a positioning unit to a destination and display the route guidance screen on a displaying unit; and
   a guidance image generating unit configured to, in a case where a remaining distance between the current position and the destination is a predetermined value or less while route guidance is performed using the route guidance screen, generate a guidance image in which a display subject representing the destination is more prominently displayed than a vicinity of the display subject, and display the guidance image on the displaying unit by overlaying the guidance image on the route guidance screen,
   wherein the guidance image includes a drawing of the destination, the drawing being based on an estimated angle of view of the destination from a predetermined position along the retrieved route, and
   wherein when, at the estimated angle of view, there is a building overlapping the destination, the drawing is generated as if the building overlapping the destination were not present.

2. The information processing system according to claim 1, wherein the display subject is given a three-dimensional appearance to be obtained when the display subject is viewed at a predetermined angle.

3. The navigation apparatus according to claim 2, wherein the display subject is given a three-dimensional appearance to be obtained when the display subject is viewed immediately after a user has passed through a guidance point that is at a predetermined distance from the destination and at which the user is notified that the user is near the destination.

4. The information processing system according to claim 2, wherein the display subject is given a three-dimensional appearance to be obtained when the display subject is viewed from a destination arrival guidance point at which a user is notified that the user has arrived at a vicinity of the destination.

5. The information processing system according to claim 3, wherein the display subject is given a three-dimensional appearance to be obtained when the display subject is viewed immediately after a user has passed through the guidance point that is at a predetermined distance from the destination and at which the user is notified that the user is near the destination, and wherein the display subject is given a three-dimensional appearance to be obtained when the display subject is viewed from the destination arrival guidance point at which the user is notified that the user has arrived at a vicinity of the destination.

6. The information processing system according to claim 1, wherein the guidance image generating unit displays the display subject in a predetermined color and displays an image of the display subject.

7. An information processing method comprising the steps of:
   causing a route guidance screen generating unit to generate a route guidance screen used for route guidance for a retrieved route from a current position measured by a positioning unit to a destination and display the route guidance screen on a displaying unit; and
   causing a guidance image generating unit to, in a case where a remaining distance between the current position and the destination is a predetermined value or less while route guidance is performed using the route guidance screen, generate a guidance image in which a display subject representing the destination is more prominently displayed than a vicinity of the display subject and display the guidance image on the displaying unit by overlaying the guidance image on the route guidance screen,
   wherein the guidance image includes a drawing of the destination, the drawing being based on an estimated angle of view of the destination from a predetermined position along the retrieved route, and
   wherein when, at the estimated angle of view, there is a building overlapping the destination, the drawing is generated as if the building overlapping the destination were not present.

8. A non-transitory computer-readable medium having stored thereon a computer-readable program for implementing an information processing method, the method comprising the steps of:
   causing a route guidance screen generating unit to generate a route guidance screen used for route guidance for a retrieved route from a current position measured by a positioning unit to a destination and display the route guidance screen on a displaying unit; and
   causing a guidance image generating unit to, in a case where a remaining distance between the current position and the destination is a predetermined value or less while route guidance is performed using the route guidance screen, generate a guidance image in which a display subject representing the destination is more prominently displayed than a vicinity of the display subject and display the guidance image on the displaying unit by overlaying the guidance image on the route guidance screen,
   wherein the guidance image includes a drawing of the destination, the drawing being based on an estimated angle of view of the destination from a predetermined position along the retrieved route, and
   wherein when, at the estimated angle of view, there is a building overlapping the destination, the drawing is generated as if the building overlapping the destination were not present.

9. An information processing system comprising:
   a route guidance screen generating unit configured to generate a route guidance screen used for route guidance for a retrieved route from a current position measured by a positioning unit to a destination and display the route guidance screen on a displaying unit; and
   a guidance image receiving unit configured to, in a case where a remaining distance between the current position and the destination is a predetermined value or less while route guidance is performed using the route guidance screen, receive a guidance image in which a display subject representing the destination is more prominently displayed than a vicinity of the display subject, and display the guidance image on the displaying unit by overlaying the guidance image on the route guidance screen, wherein the guidance image includes a drawing of the destination, the drawing being based on an estimated angle of view of the destination from a predetermined position along the retrieved route, and wherein when, at the estimated angle of view, there is a building overlapping the destination, the drawing is generated as if the building overlapping the destination were not present.

10. The information processing system according to claim 9, wherein the display subject is given a three-dimensional appearance to be obtained when the display subject is viewed at a predetermined angle.

11. The information processing system according to claim 10, wherein the display subject is given a three-dimensional appearance to be obtained when the display subject is viewed immediately after a user has passed through a guidance point that is at a predetermined distance from the destination and at which the user is notified that the user is near the destination.

12. The information processing system according to claim 11, wherein the display subject is given a three-dimensional appearance to be obtained when the display subject is viewed immediately after a user has passed through the guidance point that is at a predetermined distance from the destination and at which the user is notified that the user is near the destination, and wherein the display subject is given a three-dimensional appearance to be obtained when the display subject is viewed from the destination arrival guidance point at which the user is notified that the user has arrived at a vicinity of the destination.

13. The information processing system according to claim 10, wherein the display subject is given a three-dimensional appearance to be obtained when the display subject is viewed from a destination arrival guidance point at which a user is notified that the user has arrived at a vicinity of the destination.

14. The information processing system according to claim 9, wherein the guidance image receiving unit displays the display subject in a predetermined color and displays an image of the display subject.

15. An information processing system comprising:
a control unit configured to control a display unit to display
A) a first image used for route guidance for a retrieved route from a current position measured by a positioning unit to a destination and
B) a second image in which a display subject representing the destination is more prominently displayed than a vicinity of the display subject by overlaying on the first image, in a case where a remaining distance between the current position and the destination is a predetermined value or less while route guidance is performed using the first image, wherein the second image includes a drawing of the destination, the drawing being based on an estimated angle of view of the destination from a predetermined position along the retrieved route, and wherein when, at the estimated angle of view, there is a building overlapping the destination, the drawing is generated as if the building overlapping the destination were not present.

16. An information processing system comprising:
a display unit configured to display
A) a first image used for route guidance for a retrieved route from a current position measured by a positioning unit to a destination and
B) a second image in which a display subject representing the destination is more prominently displayed than a vicinity of the display subject by overlaying on the first image, in a case where a remaining distance between the current position and the destination is a predetermined value or less while route guidance is performed using the first image, wherein the second image includes a drawing of the destination, the drawing being based on an estimated angle of view of the destination from a predetermined position along the retrieved route, and wherein when, at the estimated angle of view, there is a building overlapping the destination, the drawing is generated as if the building overlapping the destination were not present.

* * * * *